(12) United States Patent
Hikmet et al.

(10) Patent No.: US 12,485,605 B2
(45) Date of Patent: Dec. 2, 2025

(54) METHOD FOR 3D PRINTING OF A THERMALLY CONDUCTIVE 3D ITEM

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

(*) Notice: Subject to any disclaimer, the term of this patent is extended or adjusted under 35 U.S.C. 154(b) by 63 days.

(21) Appl. No.: 18/715,868

(22) PCT Filed: Dec. 15, 2022

(86) PCT No.: PCT/EP2022/086011
§ 371 (c)(1),
(2) Date: Jun. 3, 2024

(87) PCT Pub. No.: WO2023/126187
PCT Pub. Date: Jul. 6, 2023

(65) Prior Publication Data
US 2025/0042080 A1    Feb. 6, 2025

(30) Foreign Application Priority Data
Dec. 27, 2021 (EP) .................................... 21217773

(51) Int. Cl.
*B29C 64/118*    (2017.01)
*B29K 505/00*    (2006.01)
(Continued)

(52) U.S. Cl.
CPC ........ *B29C 64/118* (2017.08); *B29K 2505/00* (2013.01); *B29K 2995/0013* (2013.01);
(Continued)

(58) Field of Classification Search
CPC ........ B29C 64/119; B33Y 10/00; B33Y 80/00
See application file for complete search history.

(56) References Cited

U.S. PATENT DOCUMENTS

| | | | |
|---|---|---|---|
| 12,311,601 B2 * | 5/2025 | Van Bommel | F21V 7/24 |
| 2002/0154741 A1 * | 10/2002 | Rigali | B33Y 70/00 378/143 |

(Continued)

*Primary Examiner* — Nahida Sultana

(57) ABSTRACT

The present invention relates to a method for manufacturing a 3D item (100) by means of fused deposition modelling (FDM), the method comprising the steps of: a) providing a shell component (5') comprising a thermoplastic 3D printable shell material having a shell melting temperature (Tms) and/or a shell glass transition temperature (Tgs); b) providing a core component (2') comprising a plurality of thermally conductive wires (3) and a flexible mantle (4) enclosing the plurality of thermally conductive wires (3); c) feeding the shell component (5) into a nozzle (6) of a 3D printer, the nozzle (6) having a nozzle temperature (Tn) being equal to or greater than the shell melting temperature (Tms) and/or the shell glass transition temperature (Tgs); d) a layer-wise depositing of the 3D printable shell material and the core component (2) to provide the 3D item (100) comprising a core-shell layer (100') of 3D printed material, wherein the 3D printed material comprises a core (102) comprising the core component, and shell (105) comprising 3D printed shell material, wherein the shell (105) at least partly encloses the core (102).

15 Claims, 5 Drawing Sheets

(51) Int. Cl.
  *B29L 31/18*  (2006.01)
  *B33Y 10/00*  (2015.01)
  *B33Y 70/10*  (2020.01)
  *B33Y 80/00*  (2015.01)

(52) U.S. Cl.
  CPC .......... *B29L 2031/18* (2013.01); *B33Y 10/00* (2014.12); *B33Y 70/10* (2020.01); *B33Y 80/00* (2014.12)

(56) References Cited

U.S. PATENT DOCUMENTS

| | | |
|---|---|---|
| 2014/0291886 A1 | 10/2014 | Mark et al. |
| 2017/0268133 A1* | 9/2017 | Graley ...................... C01F 1/10 |
| 2018/0141274 A1 | 5/2018 | Fink et al. |
| 2020/0324462 A1 | 10/2020 | Newell |
| 2022/0250310 A1* | 8/2022 | Hu ...................... C23C 18/1641 |
| 2023/0001483 A1* | 1/2023 | Sayed ...................... B22F 7/00 |
| 2023/0049026 A1* | 2/2023 | Kotikian ................ B33Y 80/00 |

* cited by examiner

METHOD FOR 3D PRINTING OF A THERMALLY CONDUCTIVE 3D ITEM

CROSS-REFERENCE TO PRIOR APPLICATIONS

This application is the U.S. National Phase application under 35 U.S.C. § 371 of International Application No. PCT/EP2022/086011, filed on Dec. 15, 2022, which claims the benefit of European Patent Application No. 21217773.7, filed on Dec. 27, 2021. These applications are hereby incorporated by reference herein.

TECHNICAL FIELD

The present invention relates to a method for manufacturing a thermally conductive 3D printed item. Further, the invention relates to a filament for use in such a method. The invention also relates to the 3D printed item obtainable with such method. Further, the invention relates to a lighting device including such a 3D printed item.

BACKGROUND

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals, and polymers.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, e.g., for thermoplastics, the filament is melted and extruded before being laid down. In general, FDM printers use a thermoplastic filament, which is heated to its melting point and then extruded, layer by layer, or in fact filament after filament to create a three-dimensional object. FDM printers are relatively fast, low cost and can be used for printing complicated 3D objects. Such printers are used in printing various shapes using various polymers. The technique is also being further developed in the production of LED luminaires and lighting solutions.

Currently, FDM is being used for the production of luminaires. While FDM is very useful in producing polymeric parts of a luminaire, there is still a need for materials and/or processes to be able to produce heatsinks of a luminaire. Graphite filled polymers have been evaluated for the production of heatsinks, however, the thermal conductivity of such polymers remains to be around 5 W/m·K, which is not high enough in applications where large amount of heat needs to be spread out and dissipated.

In case of metal printing, the method and the materials remain too expensive to be used in lighting applications. Therefore, heatsinks used in 3D printed luminaires are based on flat sheet or extruded profiles of aluminum being cut to desired dimensions. This means that such parts need to be pre-ordered and stored until they are used. Such an approach generates rather large costs and potentially causes delays in delivery times, contrary to what is required in producing luminaires based on additive manufacturing.

Therefore, there is a need to provide a versatile and cost-efficient method for manufacturing a 3D printed thermally conductive item.

US-2014/291886 discloses a method of using a 3D printer, wherein a void free reinforced filament is fed into an extrusion nozzle. The reinforced filament includes a core, which may be continuous or semi-continuous, and a matrix material surrounding the core. The reinforced filament is heated to a temperature greater than a melting temperature of the matrix material and less than a melting temperature of the core prior to extruding the filament from the extrusion nozzle.

SUMMARY

Considering the above, the present invention provides such a method. The method for manufacturing a 3D item by means of fused deposition modelling (FDM) comprises the steps of:

a) providing a shell component comprising a thermoplastic 3D printable shell material having a shell melting temperature $T_{ms}$ and/or a shell glass transition temperature $T_{gs}$;

b) providing a core component comprising a plurality of N thermally conductive wires and a flexible mantle enclosing the plurality of thermally conductive wires;

c) feeding the shell component into a nozzle of a 3D printer, the nozzle having a nozzle temperature $T_n$ being equal to or greater than the shell melting temperature $T_{ms}$ and/or the shell glass transition temperature ($T_{gs}$);

d) a layer-wise depositing of the 3D printable shell material and the core component to provide the 3D item comprising a core-shell layer of 3D printed material, wherein the 3D printed material comprises a core comprising the core component, and shell comprising 3D printed shell material, wherein the shell at least partly encloses the core.

The method according to the present invention thus allows for manufacturing a thermally conductive 3D item. As is evident from above, the method is simple and quick, and thus cost-efficient. The plurality of N thermally conductive wires may comprise at least 3 wires (N≥3), preferably at least 5 wires (N≥5), more preferably at least 7 wires (N≥7). The plurality of thermally conductive wires may be fed through the nozzle of the 3D printer along with the shell component. The core component may be arranged beside the shell component upon feeding to the nozzle. Alternatively, the shell component may at least partially enclose the core component upon feeding to the nozzle, as will be described in greater detail below. Such an embodiment offers the advantage of a simplified method wherein a preformed filament is used as the 3D printable material.

According to yet another embodiment, the shell component may be fed through the nozzle of the 3D printer, while the core component may be fed from another position and may be arranged to join the shell component downstream from the nozzle. According to such an embodiment, the core component does not have to pass the nozzle, which may be advantageous since the core component is not subjected to unnecessary load and stress, which otherwise may damage the core component.

The thermally conductive wires may be manufactured of any suitable material providing necessary heat dissipation. In particular, the thermally conductive material may be manufactured of tin, messing, bronze, copper, aluminum, silver, indium, solder, or combinations thereof. Further, the thermally conductive wires may be manufactured of graphite since graphite possesses excellent thermal conductivity properties. It is conceivable that the plurality of thermally conductive wires comprises a combination of metal wires and graphite wires.

Each thermally conductive wire in the plurality of thermally conductive wires may have a thermal conductivity of at least 50 W/m·K, preferably at least 200 W/m·K, more preferably at least 300 W/m·K. Indeed, the thermal conductivity of the thermally conductive wires should be as high as possible.

It should be noted that steps a) and b) may be performed simultaneously. Further, step b) may occur after step c). Alternatively, steps a), b), c) and d) may be performed in a subsequent manner, i.e., step a) is performed before step b), step b) is performed before step c), and step c) is performed before step d). The method of the present invention may comprise further steps, e.g., cooling, curing, washing, drying or the like. These additional steps may be performed between steps a), b), c) and/or d).

It is further conceivable that steps a) and b) partially overlap. In other words, step a) may still be ongoing when step b) is started. Further, steps b) and c) may partially overlap. In other words, step b) may still be ongoing when step c) is started.

The term "3D printable material" refers to the material to be deposited or printed, and the term "3D printed material" refers to the material that is obtained after deposition. The 3D printable material according to the present invention comprises thermoplastic material, while the 3D printed material refers to the material comprising the thermoplastic material, the thermally conductive wires, and the flexible mantle. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material.

Herein, the term "3D printable material" may also be indicated as "printable material". The term "polymeric material" may refer to a blend of different polymers but may in embodiments also refer to essentially a single polymer type with different polymer chain lengths.

Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

The 3D printable material may include additives, to a volume percentage of at maximum about 60 vol. %, especially at maximum about 30 vol. %, such as at maximum 20 vol. % of the additives relative to the total volume of the thermoplastic material and additives.

The at least one additive may be selected from a group consisting of antioxidants, heat stabilizers, light stabilizers, ultraviolet light stabilizers, ultraviolet light absorbing additives, near infrared light absorbing additives, infrared light absorbing additives, plasticizers, lubricants, release agents, antistatic agents, anti-fog agents, antimicrobial agents, colorants, laser marking additives, surface effect additives, radiation stabilizers, flame retardants, and anti-drip agents. The additive may have useful properties selected from optical properties, electrical properties, thermal properties, and mechanical properties.

In general, the thermoplastic material has a glass transition temperature $T_{gs}$ and/or a melting temperature $T_{ms}$. The 3D printable material will be heated by the 3D printer before it leaves the nozzle to a temperature of at least the glass transition temperature $T_{gs}$, and in general at least the melting temperature $T_{ms}$. Hence, the printer head action may comprise heating the 3D printable material above the glass transition $T_{gs}$, or above the melting temperature $T_{ms}$. It should be noted that melting occurs when the polymer chains fall out of their crystal structures and become a disordered liquid, while glass transition is a transition which happens to amorphous polymers; that is, polymers whose chains are not arranged in ordered crystals, but are just strewn around in any fashion, even though they are in the solid state. Polymers can be amorphous, essentially having a glass transition temperature $T_{gs}$ and not a melting temperature $T_{ms}$ or can be (semi) crystalline, in general having both a glass transition temperature $T_{gs}$ and a melting temperature $T_{ms}$, with in general the latter being higher than the former. The glass transition temperature and the melting temperature may e.g., be determined with differential scanning calorimetry.

The thermoplastic material which can be used according to the invention may comprise but not limited to the following polymers: polymethyl methacrylate (PMMA), polycarbonate (PC), polystyrene (PS), polyethylene terephthalate (PET), Nylon 6, acrylonitrile butadiene styrene (ABS), polypropylene (PP), polyethylene (PE) or mixtures thereof.

The 3D printable material may be in the form of a filament having a diameter D, wherein the thickness M of the 3D printable shell material may be from 1 to 25%, preferably 2-22%, more preferably 3-20%, most preferably 5-15% of the diameter D. The diameter D of the filament may be in a range from 1 to 6 mm, more preferably 1.5 to 5 mm, most preferably 2 to 4 mm.

In other words, the 3D printable shell material may be rather thin, which improved thermal contact of the adjacent layers, and further facilitates heat conduction. The thickness M of the 3D printable shell material should be low enough such that excessive insulation is obtained. At the same time, the thickness M of the 3D printable shell material should be sufficient to provide structural integrity to the 3D printed shell of the 3D item. The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform. Instead of the term "receiver item" also the term "substrate" may be used. Therefore, the phrase "printing on a substrate" and similar phrases include amongst others directly printing on the substrate, or printing on a coating on the substrate or printing on 3D printed material earlier printed on the substrate.

Layer by layer printable material is deposited, by which the 3D printed item is generated during the printing stage.

The 3D printed item may show a characteristic ribbed structure originating from the deposited filaments. However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one more post processing actions may be executed after removing the printed item from the receiver item. Post processing may include e.g., one or more of polishing, coating, adding a functional component, cross-linking, etc. Post-processing may include smoothening the ribbed structures, which may lead to an essentially smooth surface. Post-processing may include cross-linking of the thermoplastic material. This may result in fewer or no thermoplastic properties of the material.

The 3D printed shell may fully enclose the core (in cross-sectional view). Alternatively, the shell may only enclose the core at areas that will become the exterior of the 3D printed item using this method. Therefore, no shell may be present between cores of adjacent layers, i.e., cores of the adjacent layers may be in contact with each other. Such an embodiment provides the advantage of improved thermal conductivity between the core layers. Further, core-shell layers may be aligned.

Each thermally conductive wire in the plurality of the thermally conductive wires may have a diameter in the range from 5 µm-200 µm. According to such an embodiment, flexibility of printing is obtained, since the thermally conductive wires are readily bendable. Further, each thermally conductive wire in the plurality of thermally conductive wires may have a diameter being same as or different from the diameter of the remaining thermally conductive wires. In particular, all the thermally conductive wires in the plurality of thermally conductive wires may have different diameters. Diameter of the Bundle of Wires in a Mantle is Preferably in the Range 0.5 mm-3 mm The core component may further comprise a filler. The filler may be used for improving thermal contact between the individual thermally conductive wires of the core component, and also between the cores of adjacent 3D printed core-shell layers. Further, the filler may be used for creating flexibility in the core, for creating space between the thermally conductive wires in the core, and/or for attaching thermally conductive wires in the core.

The filler may be in the form of continuous or discontinuous wires, pellets, particles, or combination thereof. Discontinuous wires may be chopped wires. In particular, the filler may be in the form of continuous wires arranged substantially parallel with the thermally conductive wires of the core component. Such an embodiment offers the advantage of facilitated processing of the core component, wherein the filler and the thermally conductive wires may be pre-formed as a single filament.

The filler may comprise a metal, a thermoplastic material or combination thereof. The metal may be selected from a group consisting of solder and indium. By the term "solder" is understood a fusible metal alloy used to create a permanent bond between metal workpieces. The solder may be an alloy comprising any combination of tin, copper, silver, and zinc. Further, the solder of the present invention may comprise other suitable components. According to the present invention, the filler may be soldered to the thermally conductive wires.

When the filler is in the form of a thermoplastic material, it may comprise thermally conductive particles, e.g., metal particles.

The filler may have a filler melting temperature Tmf being lower than the shell melting temperature Tms and/or the shell glass transition temperature (Tgs). In such an embodiment, the method may further comprise the step of:

e) heating the 3D item to a treatment temperature Tt being greater than the filler melting temperature Tmf and lower than the shell melting temperature Tms and/or a shell glass transition temperature (Tgs).

Step e) occurs after step d). Step e) may be performed by placing the 3D item in an oven having the treatment temperature Tt, whereupon the filler having melting temperature Tmf being lower than the treatment temperature Tt will melt, but the 3D printed shell as well as the core having melting temperature being greater than the treatment temperature Tt will maintain its integrity. The molten filler will seal the voids between individual thermally conductive wires and also between the cores of adjacent 3D printed layers, thus increasing the contact area between individual wires and between the cores of adjacent 3D printed layers, leading to an improved thermal conductivity of the entire 3D printed item.

The 3D printer used in the method of the present invention may comprise a printer head comprising the nozzle. Further, the 3D printer may further comprise a platform, wherein the printer head may be movable in an xy-plane, and wherein the platform may be movable in a z-plane being substantially perpendicular to the xy-plane or may be rotatable around a z-axis.

Such a configuration may be used for printing the 3D item using the core component and the shell component in the form of a filament, such that both the shell component and the core component pass through the nozzle. In such a filament, the shell component and the core component may be arranged adjacently to each other. Alternatively, the shell component may at least partially enclose the core component. Such an embodiment provides the advantage of symmetrically arranged core-shell layers of the 3D printed item.

The core component and the shell component may be fed through an inlet in the nozzle. Alternatively, the core component and shell component may be fed into the nozzle through at least two different inlets.

In the embodiment wherein the platform is not rotatable, each thermally conductive wire in the plurality of the thermally conductive wires should have a diameter in the range from 5 µm-200 µm, such that the mechanical stress caused by the rotation is compensated for by great flexibility of the thermally conductive wires. Rotating thermally conductive wires during printing with its holder connected to the printer head can also overcome stress build up.

Regardless of the configuration of the platform of the 3D printer mentioned above, the core component may be fed from a core feeding device downstream from the nozzle, such that only the shell component passes the nozzle. Further, the core component may be fed into the nozzle as described above, such that 3D printable material in the form of the core enclosed by the shell leaves the nozzle.

The 3D printer may comprise rotatable printer head comprising the nozzle. In such a configuration, the shell component may be fed through the nozzle, while the core component should be fed from a core feeding device downstream from the nozzle, such as entangling of the thermally conductive wires is avoided. Such an embodiment may be advantageous if it is desired to protect the core component from possibly damaging mechanical processing.

The flexible mantle enclosing the thermally conductive wires may have a mantle melting temperature Tmm being greater than the nozzle temperature Tn. Further, the thermally conductive wires may have a wire melting temperature Tmw being greater than the nozzle temperature Tn. In other words, neither the mantle nor the thermally conductive wires will melt when passing through the nozzle of the 3D printer. The wire melting temperature Tmw may be at least 300° C.

The flexible mantle may be continuous or discontinuous along the longitudinal extension of the thermally conductive wires. Further, the flexible mantle may be arranged in the form of a net comprising a plurality of apertures, such that a portion of thermally conductive wires is exposed, while the entire bundle of the thermally conductive wires is still held together by means of the flexible mantle. The size and pattern of the apertures in the flexible mantle may vary depending on e.g., the diameter of the bundle of the thermally conductive wires, the material of the flexible mantle or the like.

The filler may have a filler melting temperature Tmf being equal to or lower than the nozzle temperature Tn. In such an embodiment, the filler will melt when the core component passes through the nozzle of the 3D printer, thus sealing the voids between individual thermally conductive wires and also between the cores of adjacent 3D printed layers, thus increasing the contact area between individual wires and between the cores of adjacent 3D printed layers, leading to an improved thermal conductivity of the entire 3D printed item.

As mentioned above, the nozzle may comprise at least two different inlets. In such a configuration, the printer head may move along only one axis, i.e., x or y axis, thus minimizing the stress on the thermally conductive wires.

The present invention further relates to a filament for producing a 3D item by means of fused deposition modelling. The filament comprises a core comprising a core component comprising a plurality of thermally conductive wires and a flexible mantle enclosing the plurality of thermally conductive wires. The filament further comprises a shell comprising a shell component comprising a thermoplastic 3D printable shell material having a shell melting temperature Tms and/or a shell glass transition temperature Tgs. The shell may at least partly enclose the core. In particular, the shell may fully enclose the core. i.e., the filament may be pre-formed, thus comprising a bundle of thermally conductive wires enclosed by a flexible mantle as the core component, and a shell component around it. Such pre-formed filaments may be produced by extrusion where the shell component is arranged around the core component. Alternatively, the core and the shell may be arranged adjacent to each other.

The flexible mantle offers the advantage of providing a more defined bundle of thermally conductive wires and holding the wires together during printing. The flexible mantle also helps to maintain good thermal contact between individual wires within the bundle but also between the core of adjacent 3D printed core-shell layers. The flexible mantle may be a wire braiding, a cotton thread, a fabric or flexible weaved metal fibres, or combinations thereof. In order to further improve structural integrity of the core component, the bundle of thermally conducted wires may be twisted. The twisting should not be too tight to make the bundle too stiff so that it cannot be used for printing. At the same time, the twisting should not be too loose such that the bundle will spread under its own weight during printing.

The mantle is preferably made from a thermally conductive material. If the mantle is made from an insulating material, it is preferably relatively thin. The flexible mantle may be removed by the edge of the nozzle during printing in embodiments wherein the core component is fed through the nozzle of the 3D printer. As mentioned above, the melting temperature of the mantle Tm should be greater than the nozzle temperature Tn, such that the flexible mantle maintains its structural integrity when passing through the nozzle of the 3D printer. Further, Tm should be greater than Tt, such that the mantle maintains its integrity when the 3D item is heated in step e), should this step be present.

The present invention further relates to a 3D item comprising 3D printed material, wherein the 3D item comprises a plurality of layers of 3D printed material, wherein at least one of the layers comprises a core-shell layer of 3D printed material; wherein the 3D printed material comprises:
 a core comprising a core component comprising a plurality of thermally conductive wires and a flexible mantle enclosing the plurality of thermally conductive wires;
 and a shell comprising 3D printed shell material, wherein the shell at least partly encloses the core.

A core-shell layer of the 3D printed item may have a layer width (W1), and a shell that has a shell width (W2), wherein $0.01 \leq W2/W1 \leq 0.3$, preferably $0.02 \leq W2/W1 \leq 0.3$, more preferably $0.03 \leq W2/W1 \leq 0.2$. A smaller shell width W2 may result in an improved heat dissipation, while a larger shell width W2 may lead to better mechanical properties.

The core-shell layer may be printed with a core-shell nozzle and may be obtained from a core-shell filament such as e.g., described above.

According to the present invention, the 3D printed core-shell layer may have a width WL and a height HL, wherein WL/HL>1.2, preferably WL/HL>1.5, more preferably WL/HL>1.8, most preferably WL/HL>2. Such a ratio may be advantageous in order to maintain structural integrity of the 3D printed item and induce good thermal contact between the bundles of thermally conductive wires in the core. The 3D printed item may comprise a plurality of layers on top of each other, i.e., stacked layers. It should be noted that the layer width WL and/or layer height HL of each layer may be same as or different from the layer width WL and/or layer height HL of the other layers. The 3D printed item may comprise at least 5 layers, like at least 8 layers, such as at least 10 layers. The thickness of the core in the 3D item may be greater than 0.5 mm, preferably greater than 1 mm.

The core of said core-shell layer of 3D printed material may have a diameter D1, while the shell of the core-shell layer of 3D printed material may have a thickness Ths, wherein Ths<0.1·D1. The core diameter D1 may be equal to or greater than the height HLL. Preferably, the diameter D1 of the core is in a range from 0.3 to 2.5 mm, more preferably from 0.4 to 2 mm; most preferably from 0.5 to 1.8 mm. Further, the thickness Ths of the shell may be in a range from 0.05 to 1 mm, more preferably from 0.1 to 0.8 mm, most preferably from 0.2 to 0.6 mm.

Finally, the present invention relates to a lighting device comprising the 3D item as described above, wherein the 3D item is configured as a heat sink. The lighting device according to the present invention thus comprises a heat sink being very efficient in heat dissipation due to improved thermal contact between the individual thermally conductive wires, and also between adjacent 3D printed layers.

The 3D item may further comprise a coating. The coating may comprise several layers and may be arranged for improving aesthetical appearance, providing additional UV resistance, and preventing penetration of fluid and/or gas. Further, the 3D item may comprise a reinforcing additive, e.g., glass fibers, arranged to increase the impact strength of the 3D item.

If the 3D item of the present invention is intended for outdoor use, the 3D item may comprise an herbicide or a pesticide in order to prevent growth of algae and other biological species on 3D item, which otherwise may lead to deterioration of the outer layer of the 3D item and also negatively affect the aesthetical appearance. The 3D item may be self-cleaning and/or may comprise a substance that facilitates cleaning.

BRIEF DESCRIPTION OF THE DRAWINGS

Embodiments of the invention will now be described by way of example with reference to the accompanying drawings, of which.

Figure 1:
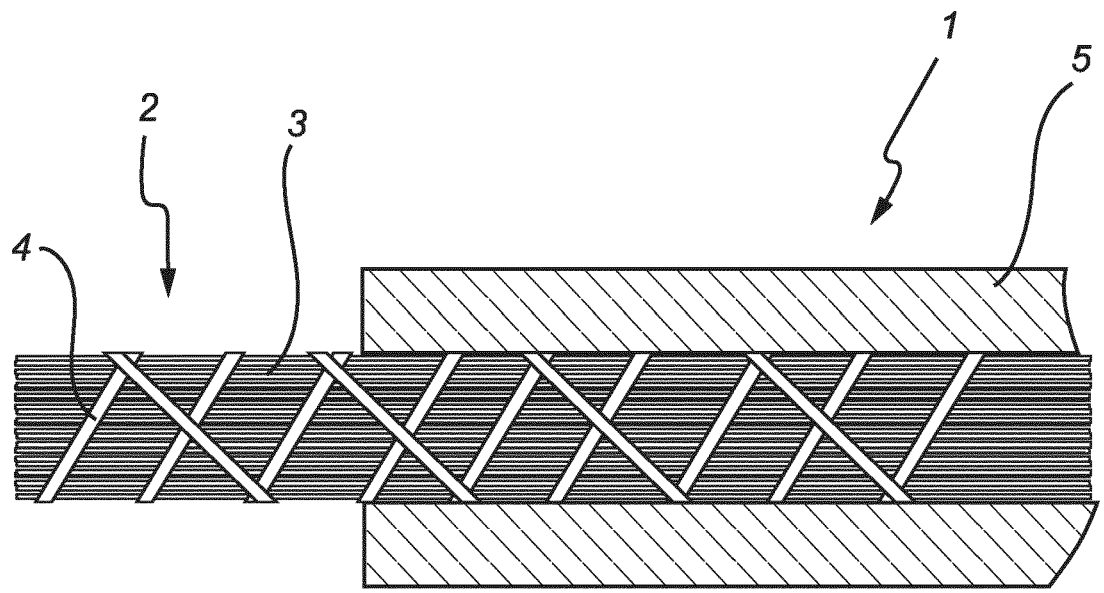
FIG. 1 is a side view of the partial transversal cross-section of the filament according to the present invention.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 illustrates a partial transversal cross-section of the filament 1 according to the present invention. The filament 1 comprises a core 2 comprising a core component comprising a plurality of thermally conductive wires 3 and a flexible mantle 4 enclosing the plurality of thermally conductive wires 3. As may be seen in FIG. 1, the flexible mantle 4 is arranged in the form of a net, such that a portion of thermally conductive wires 3 is exposed, while the entire bundle of the thermally conductive wires 3 is still held together by means of the flexible mantle 4.

Figure 2:
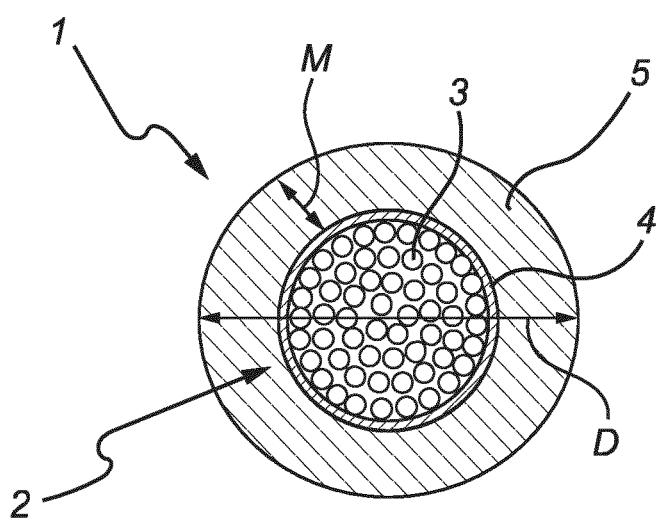
FIG. 2 is a transversal cross-section of the filament according to the present invention.

The filament 1 further comprises a shell 5 comprising a shell component comprising a thermoplastic 3D printable shell material having a shell melting temperature Tms and/or a shell glass transition temperature Tgs. The shell 5 fully enclose the core 2. The transversal cross-section of the fiber 1 is depicted in FIG. 2.

The filament 1 has a diameter D. The thickness M of the shell 5 may be from 1 to 25%, preferably 2-22%, more preferably 3-20%, most preferably 5-15% of the diameter D. In other words, the shell 5 is rather thin, which improved thermal contact of the adjacent layers, and further facilitates heat dissipation.

Figure 3:
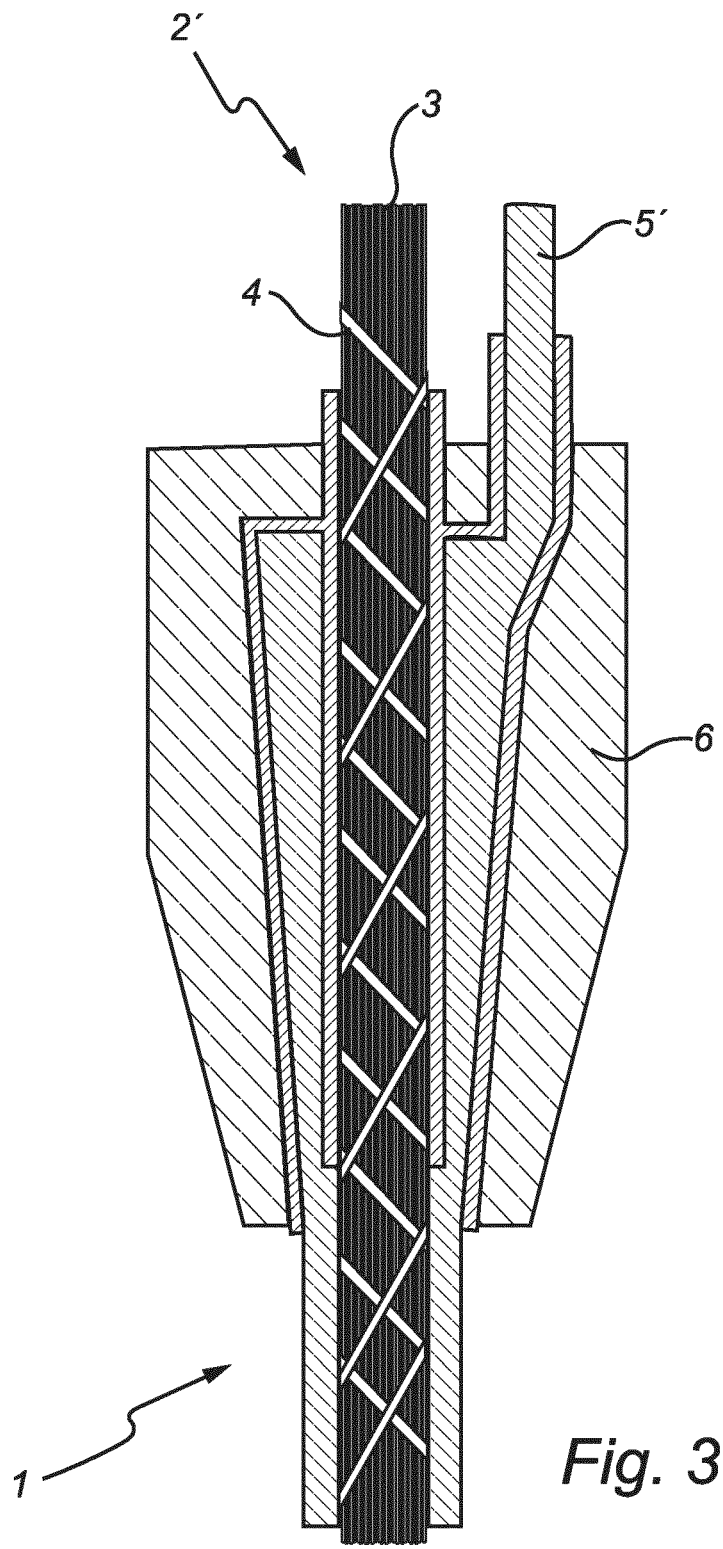
FIG. 3 is a cross-section of the nozzle used in the method of the present invention.

FIG. 3 shows a cross-section of the nozzle 6 used in the method of the present invention. As may be seen, the core component 2' is fed through the nozzle 6 along with the shell component 5'. Since the melting temperature Tms of the shell component 5' is lower than the nozzle temperature Tn, and the melting temperature Tmw of the thermally conductive wires 3 as well as the melting temperature Tm of the mantle 4 is higher that the nozzle temperature Tn, the shell component 5' will melt, while the core component 2' will remain intact. Downstream the nozzle 6, the core component 2' and the shell component 5' are combined thus forming the filament 1.

Figure 4:
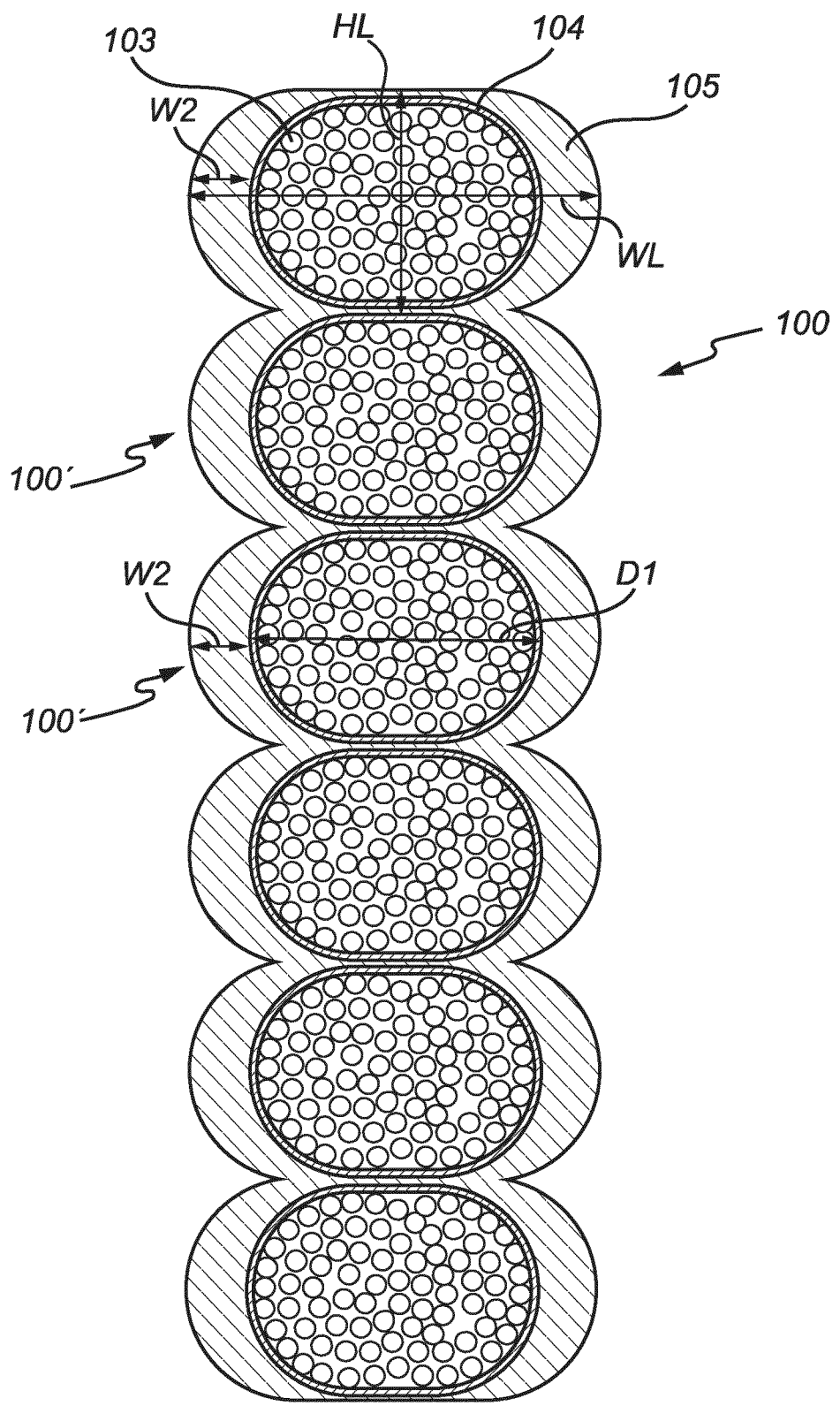
FIG. 4 is a cross-section of the 3D printed core-shell layers.

FIG. 4 depicts a cross-sectional view of the plurality of 3D printed core-shell layers 100' of the 3D item 100. Each core-shell layer 100' of the 3D printed material comprises:

a core 102 comprising a core component comprising a plurality of thermally conductive wires 103 and a flexible mantle 104 enclosing the plurality of thermally conductive wires 103;

and a shell 105 comprising 3D printed shell material, wherein the shell 105 at least partly encloses the core 102.

A core-shell layer 100' of the 3D printed item 100 has a layer width (WL), and a shell that has a shell width (W2), wherein $0.01 \leq W2/WL \leq 0.3$, preferably $0.02 \leq W2/WL \leq 0.3$, more preferably $0.03 \leq W2/WL \leq 0.2$. A smaller shell width W2 may result in an improved heat dissipation, while a larger shell width W2 may lead to better mechanical properties.

According to the present invention, the 3D printed core-shell layer has a width WL and a height HL, wherein WL/HL>1.2, preferably WL/HL>1.5, more preferably WL/HL>1.8, most preferably WL/HL>2. Such a ratio may be advantageous in order to maintain structural integrity of the 3D printed item. The 3D printed item 100 comprises a plurality of layers 100' on top of each other, i.e., stacked layers.

The 3D printed shell 105 fully encloses the core 102 (in cross-sectional view). Further, core-shell layers 100' are aligned.

The core 102 of the core-shell layer 100' of 3D printed material 100 has a diameter D1, while the shell 105 of the core-shell layer 100' of 3D printed material 100 has a thickness W2, wherein $W2 < 0.1 \cdot D1$. The core diameter D1 may be equal to or greater than the height HLL.

Figure 5:
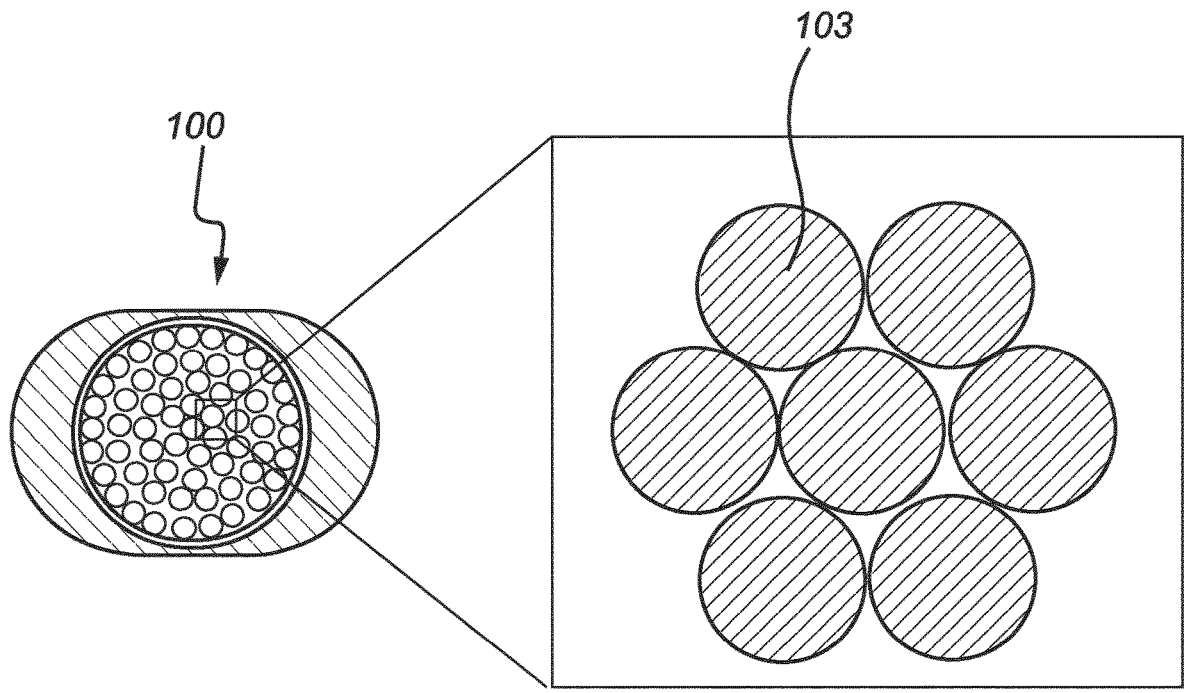
FIG. 5 is a detailed view of the transversal cross-section of the core in the 3D printed core-shell layer.

FIG. 5 illustrates a detailed view of the thermally conductive wires 103 in the core-shell layer 100'.

Figure 6:
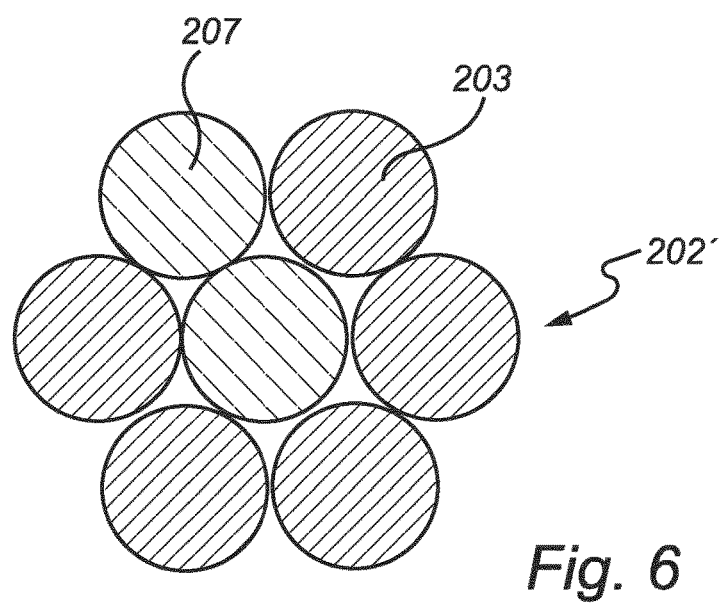
FIG. 6 is a detailed view of the transversal cross-section of the core comprising a filler in the 3D printed core-shell layer.

As may be seen in FIG. 6, the core component 202' further comprises a filler 207. The filler 207 may be used for improving thermal contact between the individual thermally conductive wires 203 of the core component 202', and also between the cores of adjacent 3D printed core-shell layers.

The filler 207 depicted in FIG. 6 is in the form of continuous wires arranged substantially parallel with the thermally conductive wires 203 of the core component 202'.

The filler 207 comprises a metal.

Figure 7:
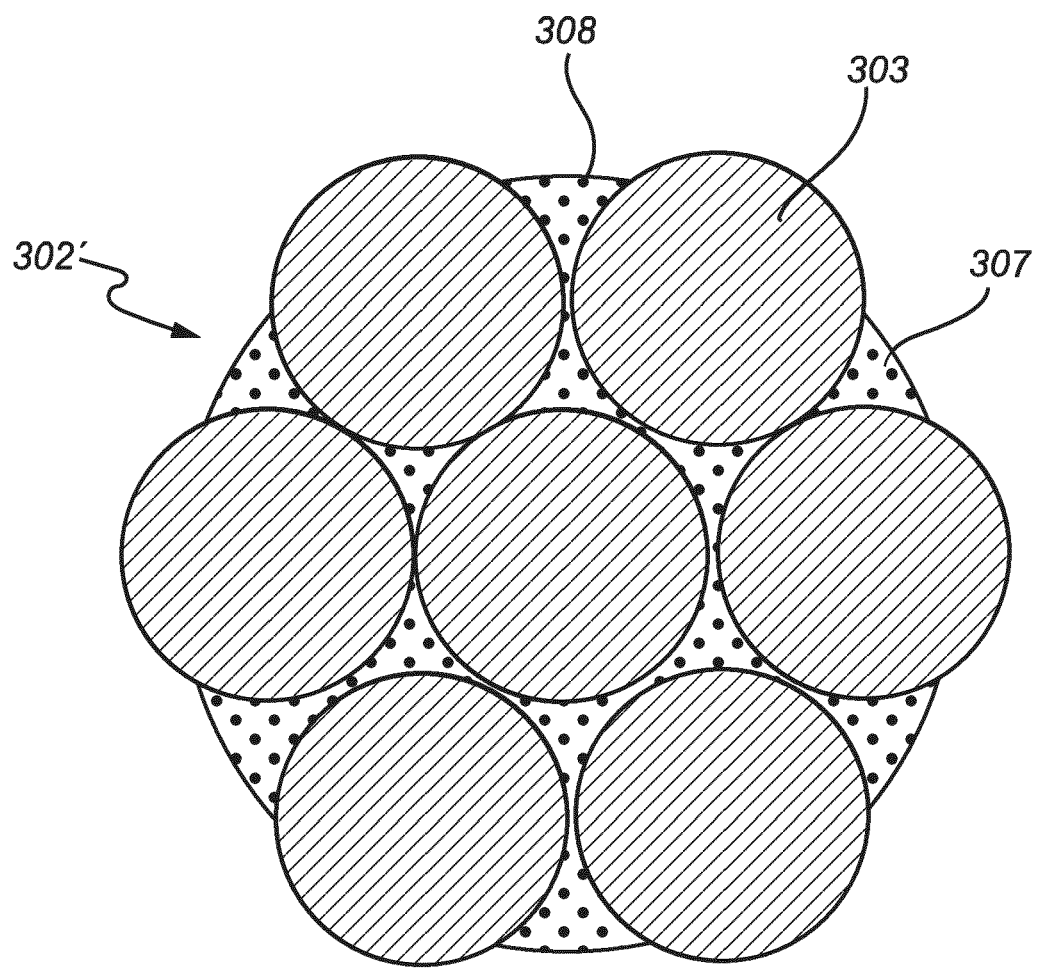
FIG. 7 is a detailed view of the transversal cross-section of the core comprising another filler in the 3D printed core-shell layer.

In the embodiment shown in FIG. 7, the filler 307 is in the form of the thermoplastic material comprising thermally conductive particles 308, e.g., metal particles.

As may be seen in FIG. 7, the molten filler 307 will seal the voids between individual thermally conductive wires 303 and also between the cores of adjacent 3D printed layers, thus increasing the contact area between individual wires 303 and between the cores of adjacent 3D printed layers, leading to an improved thermal conductivity of the entire 3D printed item.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention. While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for manufacturing a 3D item by means of fused deposition modelling, said method comprising the steps of:
    a) providing a shell component comprising a thermoplastic 3D printable shell material having a shell melting temperature and/or a shell glass transition temperature;
    b) providing a core component comprising a plurality of N thermally conductive wires and a flexible mantle at least partly enclosing said plurality of thermally conductive wires;
    c) feeding said shell component into a nozzle of a 3D printer, wherein the core component is arranged beside the shell component upon feeding into the nozzle, or wherein the shell component at least partially encloses the core component upon feeding into the nozzle, said nozzle having a nozzle temperature being equal to or greater than said shell melting temperature and/or said shell glass transition temperature;
    d) a layer-wise depositing of said 3D printable shell material and said core component to provide said 3D item comprising a core-shell layer of 3D printed material, wherein said 3D printed material comprises a core comprising said core component, and a shell comprising 3D printed shell material, wherein said shell at least partly encloses said core.

2. The method according to claim 1, wherein each thermally conductive wire in the plurality of said thermally conductive wires has a diameter in the range from 5 μm-200 μm.

3. The method according to claim 1, wherein each thermally conductive wire in the plurality of said thermally conductive wires is a metal wire or a graphite wire.

4. The method according to claim 1, wherein each thermally conductive wire in the plurality of said thermally conductive wires has a thermal conductivity of at least 50 $W \cdot m^{-1} \cdot K^{-1}$.

5. The method according to claim 1, wherein said core component further comprises a filler.

6. The method according to claim 5, wherein said filler is in the form of continuous or discontinuous wires, pellets, particles, or combination thereof.

7. The method according to claim 5, wherein said filler comprises a metal, a thermoplastic material or combination thereof.

8. The method according to claim 7, wherein said metal is selected from a group consisting of solder and indium.

9. The method according to claim 5, wherein said filler has a filler melting temperature being equal to or lower than said nozzle temperature.

10. The method according to claim 5, wherein said filler has a filler melting temperature being lower than said shell melting temperature and/or the shell glass transition temperature, and wherein said method further comprises the step of:
    e) heating said 3D item to a treatment temperature being greater than said filler melting temperature and lower than said shell melting temperature and/or said shell glass transition temperature.

11. The method according to claim 1, wherein said flexible mantle has a mantle melting temperature being greater than said nozzle temperature, and wherein said thermally conductive wires have a wire melting temperature being greater than said nozzle temperature.

12. The method according to claim 1, wherein said 3D printer comprises a printer head comprising said nozzle, said 3D printer further comprising a platform, wherein said platform is rotatable.

13. A filament for producing a 3D item by means of fused deposition modelling, said filament comprising:
    a core comprising a core component comprising a plurality of N thermally conductive wires and a flexible mantle enclosing said plurality of thermally conductive wires;
    a shell comprising a shell component comprising a thermoplastic 3D printable shell material having a shell melting temperature and/or a shell glass transition temperature.

14. A 3D item comprising 3D printed material, wherein said 3D item comprises a plurality of layers of 3D printed material, wherein at least one of said layers comprises a core-shell layer of 3D printed material; wherein said 3D printed material comprises:
    a core comprising a core component comprising a plurality of thermally conductive wires and a flexible mantle enclosing said plurality of thermally conductive wires;
    and a shell comprising 3D printed shell material, wherein said shell at least partly encloses said core.

15. A lighting device comprising said 3D item according to claim 14, wherein said 3D item is configured as a heat sink.

* * * * *